(12) United States Patent
Musk

(10) Patent No.: US 6,445,858 B1
(45) Date of Patent: Sep. 3, 2002

(54) MICRO-ALIGNMENT OF OPTICAL COMPONENTS

(75) Inventor: Robert W. Musk, Kingsbridge (GB)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/733,049

(22) Filed: Dec. 11, 2000

(51) Int. Cl.$^7$ .................................................. G02B 6/26
(52) U.S. Cl. .............................. 385/52; 385/88; 385/97
(58) Field of Search ........................... 385/52, 97, 98, 385/88, 90

(56) References Cited

U.S. PATENT DOCUMENTS

| | | | | |
|---|---|---|---|---|
| 5,392,371 A | * | 2/1995 | Morlion et al. | 385/52 |
| 5,727,099 A | * | 3/1998 | Harman | 385/140 |
| 5,870,517 A | * | 2/1999 | Wyland | 385/19 |
| 5,923,798 A | * | 7/1999 | Aksyuk et al. | 385/19 |
| 6,074,103 A | * | 6/2000 | Hargreaves et al. | 385/147 |
| 2001/0016097 A1 | * | 8/2001 | Shekel et al. | 385/33 |

* cited by examiner

Primary Examiner—Brian Sircus
Assistant Examiner—Michael C. Zarroli
(74) Attorney, Agent, or Firm—Lacasee & Associates, LLC

(57) ABSTRACT

An assembly for aligning at least one optical component with respect to a light path is described. This assembly includes a substrate having at least one integrally formed, flexural member defined by one portion of the substrate and a primary substrate portion defined by another portion of the substrate. The flexural member includes a component mounting area such that the optical component is mountable thereon and, when the optical component is so mounted, the optical component is movably alignable in the light path by displacement of the component mounting area of the flexural member relative to the primary substrate portion.

15 Claims, 12 Drawing Sheets

MICRO-ALIGNMENT OF OPTICAL COMPONENTS

The present invention relates generally to optical devices and, more particularly, to optical assemblies and associated methods for aligning optical components with respect to a light path.

BACKGROUND OF THE INVENTION

Recent developments in optical communication systems have given rise to miniaturized optical devices that include very small optical components, most of which must be aligned to micron-scale tolerances. For example, in an optical transmitter for optical communications, the output from a light source, such as a laser diode chip, is focused through a lens and coupled into an optical fiber. If a single mode fiber is used in this exemplary optical transmitter, a displacement of the optical fiber by one micron from the ideal aligned position with respect to the laser diode and lens may result in a 50% or more reduction in the optical intensity coupled into the optical fiber. Therefore, the precise alignment of optical components within the miniaturized optical devices is crucial. Furthermore, once the optical components are aligned with respect to each other, it must be possible to secure the optical components in their aligned positions.

Currently, several techniques are available in the alignment and affixation of optical components in miniaturized optical devices. For instance, the optical components may be manually moved into position then fixed onto a mounting pad by using an adhesive or by laser welding, in the case of metalized optical components or, for example, an optical fiber held in a metal sleeve or jacket. The alignment of optical components is generally performed in one of two ways: passive alignment or active alignment.

In the passive alignment technique, a number of device pits and/or grooves are formed in a mounting block on which the optical components are to be supported. The size and position of the device pits and grooves are predetermined according to the specific optical components and the desired alignment configuration such that the optical components, when mounted and fixed in the appropriate device pits and grooves, will automatically be in their aligned positions. Some examples of such passive alignment techniques are commercially available microbench assemblies and v-groove sub-assemblies.

The passive alignment technique presents a number of challenges. High precision fabrication of the optical components as well as the mounting slots and grooves are required to ensure the exact positioning of the optical components relative to each other. If there are slight misalignments, fine adjustments are usually not possible in the passive alignment scheme because the optical components are fixed in their respective slots and grooves. Furthermore, existing passive alignment schemes generally use a wet etch technology to fabricate the mounting slots and grooves. Since the shape of features formed by wet etching depends on the crystallographic plane of the substrate, the use of wet etch technology imposes limitations on the size, shape and formation precision of the mounting slots and grooves, thus potentially leading to inaccuracies in the optical component alignment.

The active alignment technique is more flexible than the passive alignment schemes in that the exact position of the individual optical component can normally be adjusted to fine tune the alignment of that optical component with respect to other components on the substrate. An example of an active alignment system is the Cronos 3D fiber aligner based on a thermal arched beam micro-electromechanical valve (see U.S. Pat. No. 6,114,794 issued to Dhuler et al). The Cronos system uses micro-electromechanical systems (MEMS) technology to provide positioning adjustments in three directions to align, for example, an optical fiber with respect to a laser diode. The optical component is mounted on a movable base which is connected to directional actuators that adjust the position of the movable base, and thus the optical component, by thermally-induced movement with respect to a mounting base.

MEMS devices, such as the Cronos system, are based on fast micro-machining using plasma etching methods. Plasma etching is a dry etch technology which exhibits no crystallographic plane dependency in the shape and depth of etching. Deep etch features with clean edges and excellent verticality are possible with plasma etching technology, thus enabling the manufacture of miniature but complex active alignment systems.

The currently available, active alignment technologies have certain drawbacks. Typically, these systems are bulky and complex in comparison to the passive alignment systems due to the use of separate actuators. Furthermore, most of these systems do not provide a mechanism to fix the actuators, and thereby the optical component, in an aligned position. Accoridingly, constant adjustment of the actuators is required to correct for potential drifts in the optical component position. Although the continual adjustment may be automatically performed by a feedback arrangement, such additional features add to the cost and complexity of the alignment system.

In another aspect of the prior art, certain optical arrangements (not shown) includes a light source and a photodetector, which is intended to detect light emitted by the light source. The photodetector and the light source are normally fabricated on two separate substrates. The light source emits light in a direction generally parallel to the light source substrate, and the photodetector is usually designed to detect light incident on the photodetector along a normal to the photodetector substrate. Therefore, in order to use the photodetector to detect light emitted by this light source, the photodetector substrate must be oriented at a right angle with respect to the light source substrate. The orientation of the light source with respect to the photodetector must be adjustable to provide the optimum coupling of light from the light source into the photodetector. This prior art arrangement thus requires the handling and processing of two separate components with their respective substrates and electrical connections.

The present invention provides an optical assembly which serves to resolve the problems described above with regard to prior art optical assemblies for alignment of optical components in a heretofore unseen and highly advantageous way and which provides still further advantages.

SUMMARY OF THE INVENTION

Accordingly, the present invention relates to a device for aligning a first optical component on a substrate with a second optical component comprising: arm means pivotally connected to said substrate, said arm means being pivotable in every direction; holding means for connecting the first optical component to said arm means; and actuator interface means on said arm means enabling manipulation of said arm means by an actuator.

Another aspect of the present invention relates to a method for aligning a first optical component on a substrate with a second optical component comprising the steps of:

providing arms means pivotally connected to the substrate, said arm means having holding means for connecting the optical component thereto, and actuator interface means enabling manipulation of said arm means by an actuator;

aligning the first optical component with the second optical component using the actuator to manipulate the position of said arm means; and fixing said arm means to the substrate when the first optical component is aligned with the second optical component.

BRIEF DESCRIPTION OF THE DRAWINGS

The present invention may be understood by reference to the following detailed description taken in conjunction with the drawings briefly described below.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
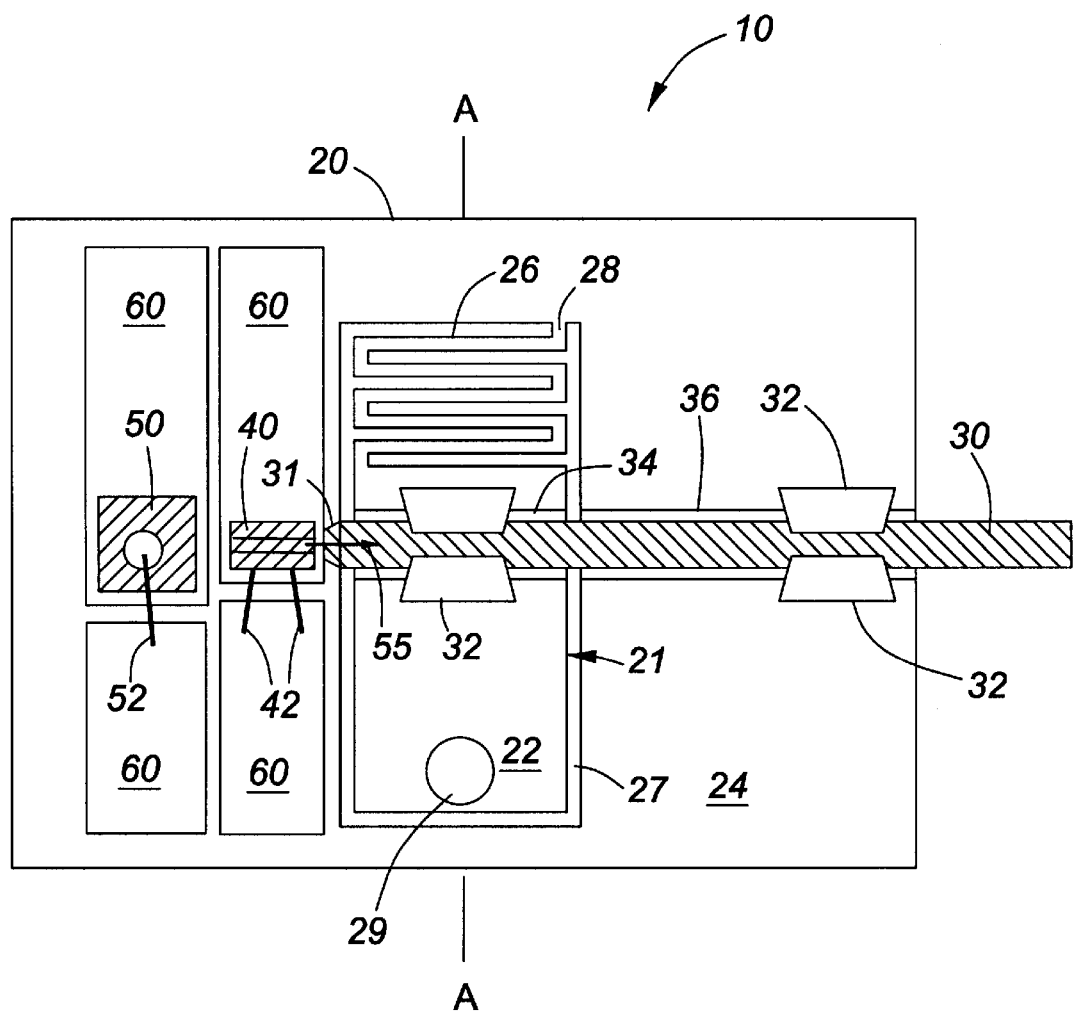
FIG. 1 is a diagrammatic plan view of one embodiment of an optical component micro-alignment assembly manufactured in accordance with the present invention shown here to illustrate a possible arrangement of a substrate including a compliant lever.
Figure 1A:
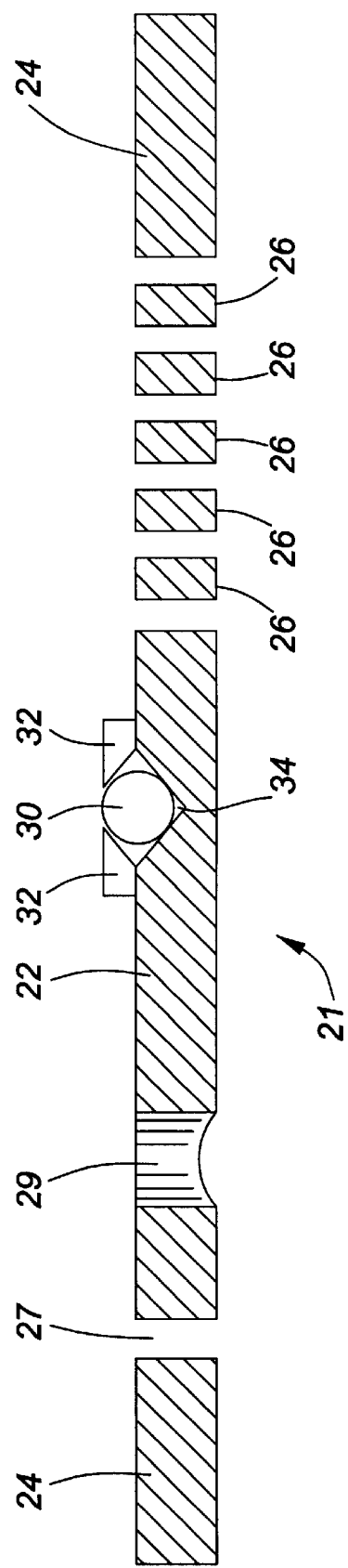
FIG. 1A is a cross-section taken through line A—A of FIG. 1.

Turning now to the drawings, wherein like components are indicated by like reference numbers throughout the various figures, attention is immediately directed to FIG. 1, which illustrates one embodiment of a micro-alignment assembly, generally indicated by the reference number 10, for the alignment of optical components. Micro-alignment assembly 10 includes a substrate 20. Substrate 20, in this example embodiment, is fabricated from a semiconductor material such as, for example, silicon.

A compliant lever arm 21 is integrally formed from substrate 20 such that substrate 20 is divided into the compliant lever arm 21 and a primary substrate portion 24, which is defined in the remainder of the substrate. Compliant lever arm 21 includes a component mounting area 22 and a resilient section 26. Component mounting area 22 is configured such that an optical component, for example an end of an optical fiber, fiber grating, microlens, or laser chip, is mountable on component mounting area 22. In the embodiment illustrated in FIG. 1, an optical fiber 30 with a lensed tip 31 is attached to component mounting area 22 by clips 32. Component mounting area 22 includes a V-groove 34 which is designed to accommodate and generally position optical fiber 30 in a predetermined location on component mounting area 22.

Continuing to refer to FIG. 1, a laser chip 40 and a photodiode 50 are mounted on mounting pads 60 on primary substrate portion 24 and electronically connected to the substrate by connectors 42 and 52, respectively. Light output from laser chip 40 establishes a light path, indicated by an arrow 55. Primary substrate portion 24 also includes another V-groove 36 for providing additional support and positional stability for optical fiber 30.

Resilient section 26, shown in FIG. 1 as having the form of a flat, baffle spring, imparts a compliancy to compliant lever 21 such that the compliant lever is movable with respect to primary substrate portion 24. The optical fiber on component mounting area 22 is thereby movable with respect to the primary substrate portion by movement of compliant lever 21 such that the position of the lensed tip of optical fiber 30 is alignable in light path 55. A groove 27 generally surrounds compliant lever arm 21 and separates compliant lever arm 21 from primary substrate portion 24 except at an attachment member 28 such that compliant lever arm 21 is movable with respect to and independently of primary substrate portion 24. The groove 27 defines a cavity in the primary substrate portion 24 into which the compliant lever arm 21 extends with a marginal space surrounding it. A circular opening 29, formed in compliant lever arm 21, is designed to allow compliant lever arm 21 to be mechanically gripped, such that compliant lever 21 is movable in the aforedescribed manner. There are several different mechanical devices that can be inserted into the opening 29 for use by an actuator in adjusting the position of the compliant lever arm 21, including a split pin, a cone or a nail head. Alternatively, the single opening 29 can be replaced by two holes, whereby a gripping tool can be used.

With optical fiber 30 fixed on component mounting area 22, micro-alignment assembly 10 readily allows fine adjustment of the aligned position of lensed tip 31 of optical fiber 30 with respect to light path 55 by manipulation of compliant lever 21. For instance, the free end of compliant lever 21 may be moved in a plane generally transverse to the light path to bring lensed tip 3 1 into alignment with the light path. Micro-alignment assembly 10 provides an advantageous way of fiber-pigtailing a laser because the entire assembly is coplanar. Since the compliant lever can be moved to compensate for displacements associated with the difference in optical axes between the laser and the optical fiber, there is advantageously no need to create additional features in the substrate (such as a device pit) to counter these mechanical differences.

Although micro-alignment assembly 10 of FIG. 1 has been described as having a specific combination of components, it should be understood that the micro-alignment assembly may be configured in a variety of ways without deviating from the spirit of the present invention. For example, compliant lever 21 may be designed to accommodate a different optical component, such as a lens, filter, mirror or a powered component such as a light source or detector, on the component mounting area in place of optical fiber 30 as shown in FIG. 1. Also, compliant lever 21 may be configured in a variety of ways provided that it functions as a flexural member which is integrally formed from the substrate and independently movable with respect to the primary substrate portion and on which at least one optical component is mountable. Furthermore, the specific selection of optical components mounted on the primary substrate area may also be varied. Still further, the shapes of substrate 20, compliant lever 21 and primary substrate portion 24 may be altered in a variety of ways while still providing adjustable movement of one or more optical component mounted on the compliant lever with respect to an associated light path. For example, component mounting area 22 can be configured to allow an optical component to be adjustably mounted thereon such that the exact position of that optical component on the component mounting area can be altered over a predetermined range. Holding clips 32 shown in FIG. 1 may be designed to firmly hold optical fiber 30 in V-groove 34 but to also allow optical fiber 30 to be slidably movable along the axial direction of the optical fiber such that the intensity of light coupled from laser chip 40 into optical fiber 30 can be controlled. Moreover, compliant lever 21 can be configured or biased such that the optical fiber is located at a predetermined, displaced location with respect to the laser chip light path. In this way, an initial bias direction of the compliant lever is advantageously known in order to bring the lensed tip of optical fiber 30 into alignment with light path 55. Biasing in this way is submitted to save processing time during manufacturing.

Figure 2A:
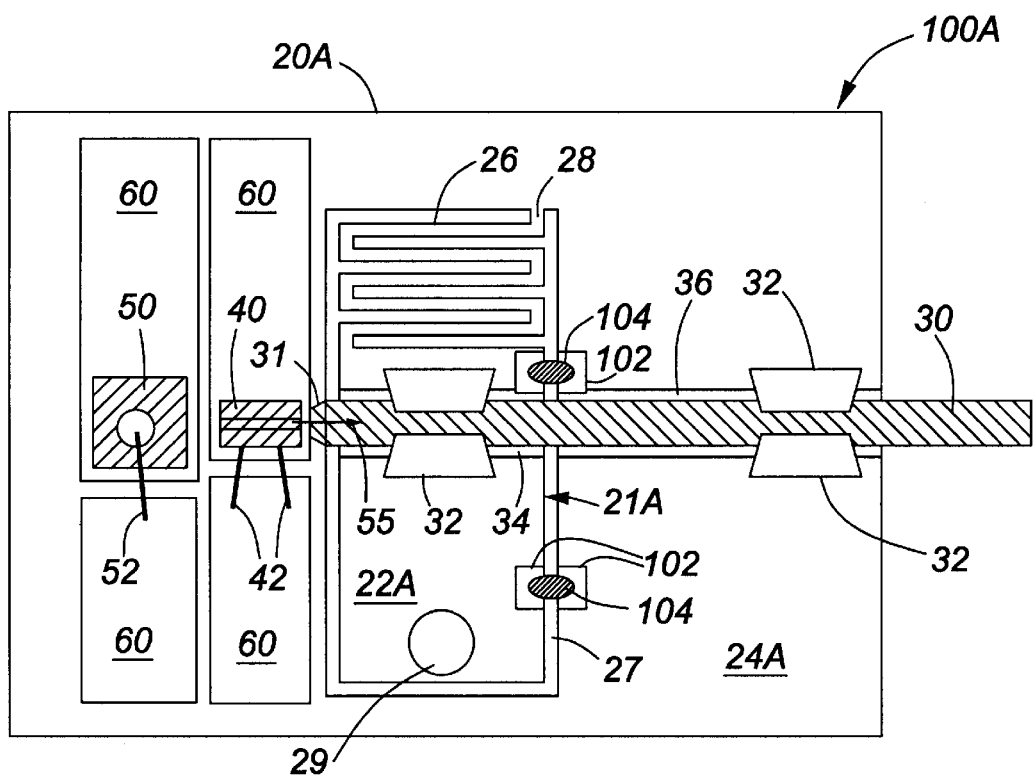
FIGS. 2A–2C are diagrammatic plan views of the micro-alignment assembly embodiment of FIG. 1 shown here to illustrate different methods for affixing the compliant lever to the remainder of the substrate.
Figure 2B:
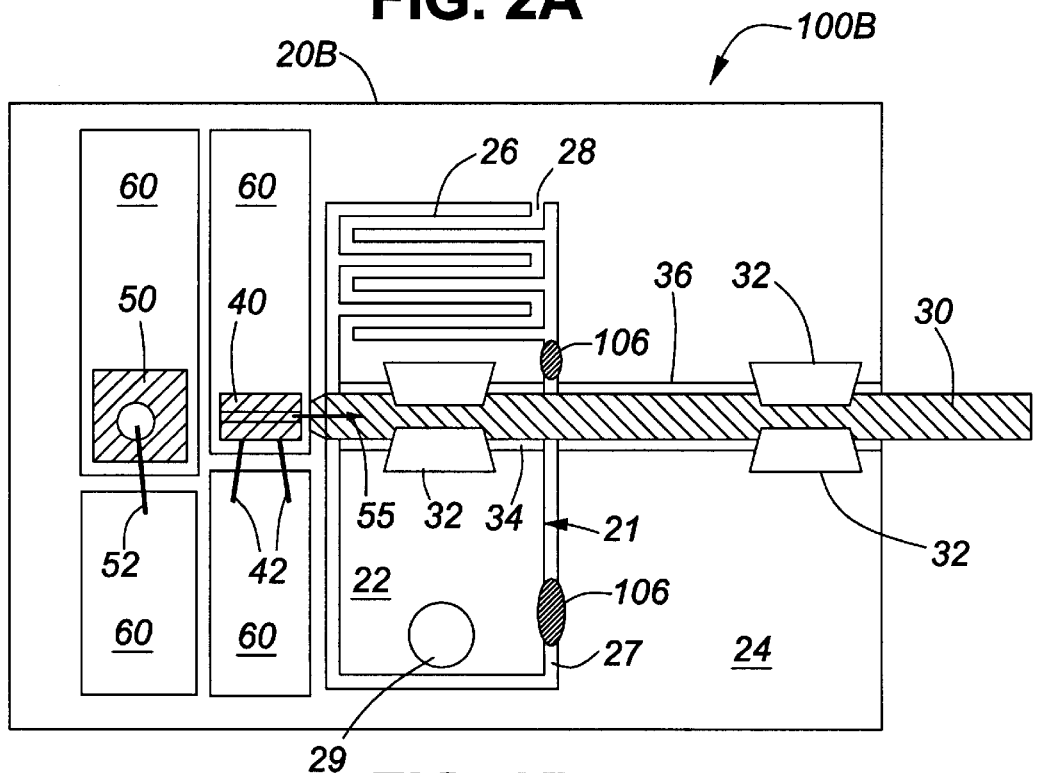
Figure 2C:
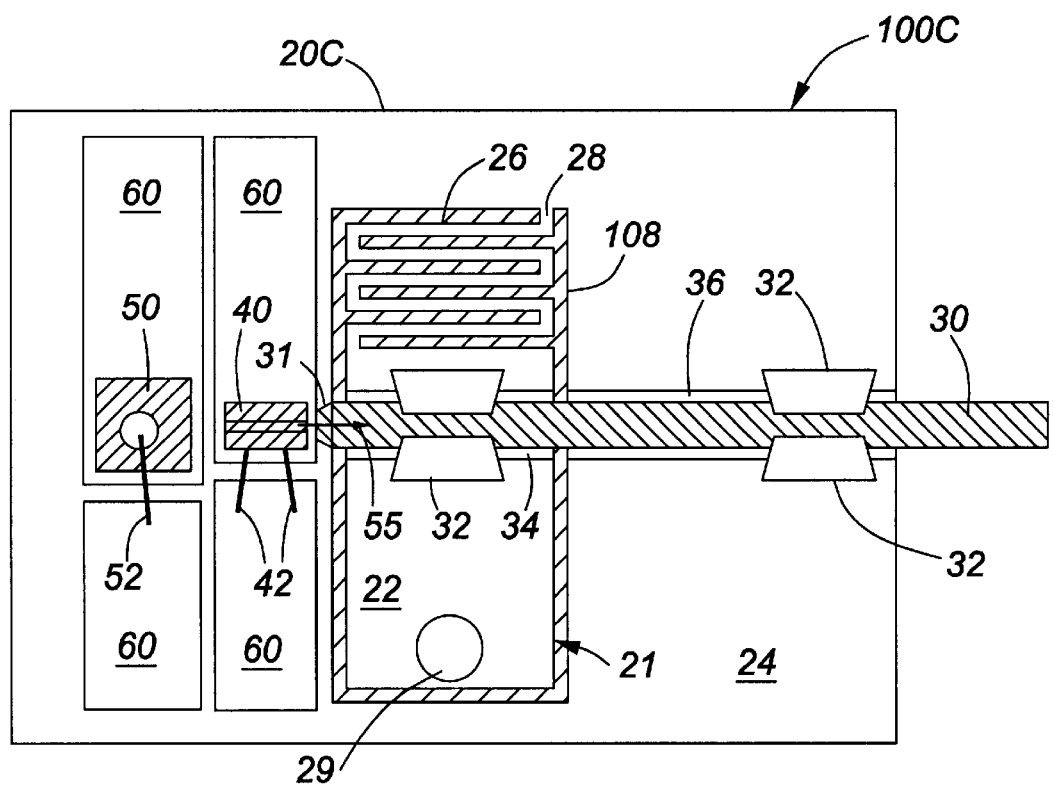

Turning now to FIGS. 2A–2C, once lensed tip 31 is brought into optimal alignment with respect to light path 55, compliant lever 21 is fixed in the aligned position with respect to primary substrate area 24 using methods such as those illustrated in FIGS. 2A–2C, for example. FIG. 2A illustrates a micro-alignment assembly 100A, which is essentially identical to micro-alignment assembly 10 of FIG. 1 but includes additional features that allow the securing of the compliant lever with respect to the primary substrate area. Micro-alignment assembly 100A includes a substrate 20A, which in turn includes a compliant lever 21A surrounded by a primary substrate area 24A. Compliant lever 21A and primary substrate area 24A are slightly modified in comparison to compliant lever 21 and primary substrate area 24, respectively, of FIG. 1 in that opposing metal pads 102 are additionally formed on compliant lever 21 A and primary substrate area 24A. Metal pads 102 are configured such that a weld 104 is formable across each pair of metal pads 102 for securing compliant lever 21A with respect to primary substrate area 24A. Weld 104 may formed, for example, by conventional laser welding methods.

Alternatively, the compliant lever can be fixed to the primary substrate area by direct laser welding, as shown in FIG. 2B. Micro-alignment assembly 100B includes substrate 20 shown in FIG. 1, here indicated by the reference number 20B. Micro-alignment assembly 100B additionally includes silicon-to-silicon laser welds 106 for securing compliant lever 21 with respect to primary substrate area 24.

Yet another alternative method for fixing the compliant lever with respect to the primary substrate portion is shown in FIG. 2C. Again, micro-alignment assembly 100C includes substrate 20 as shown in FIG. 1, here indicated by reference number 20C. In micro-alignment assembly 100C, however, space 27 is filled with an adhesive 108. For instance, adhesive 108 may be an epoxy which is injected into space 27 such that, when the epoxy is cured, adhesive 108 serves to secure compliant lever 21 with respect to primary substrate area 24 and lensed tip 31 is fixed in an aligned position in light path 55. As another example, a low viscosity epoxy can be used as adhesive 108 such that the epoxy is drawn into space 27 by capillary action.

Figure 2D:
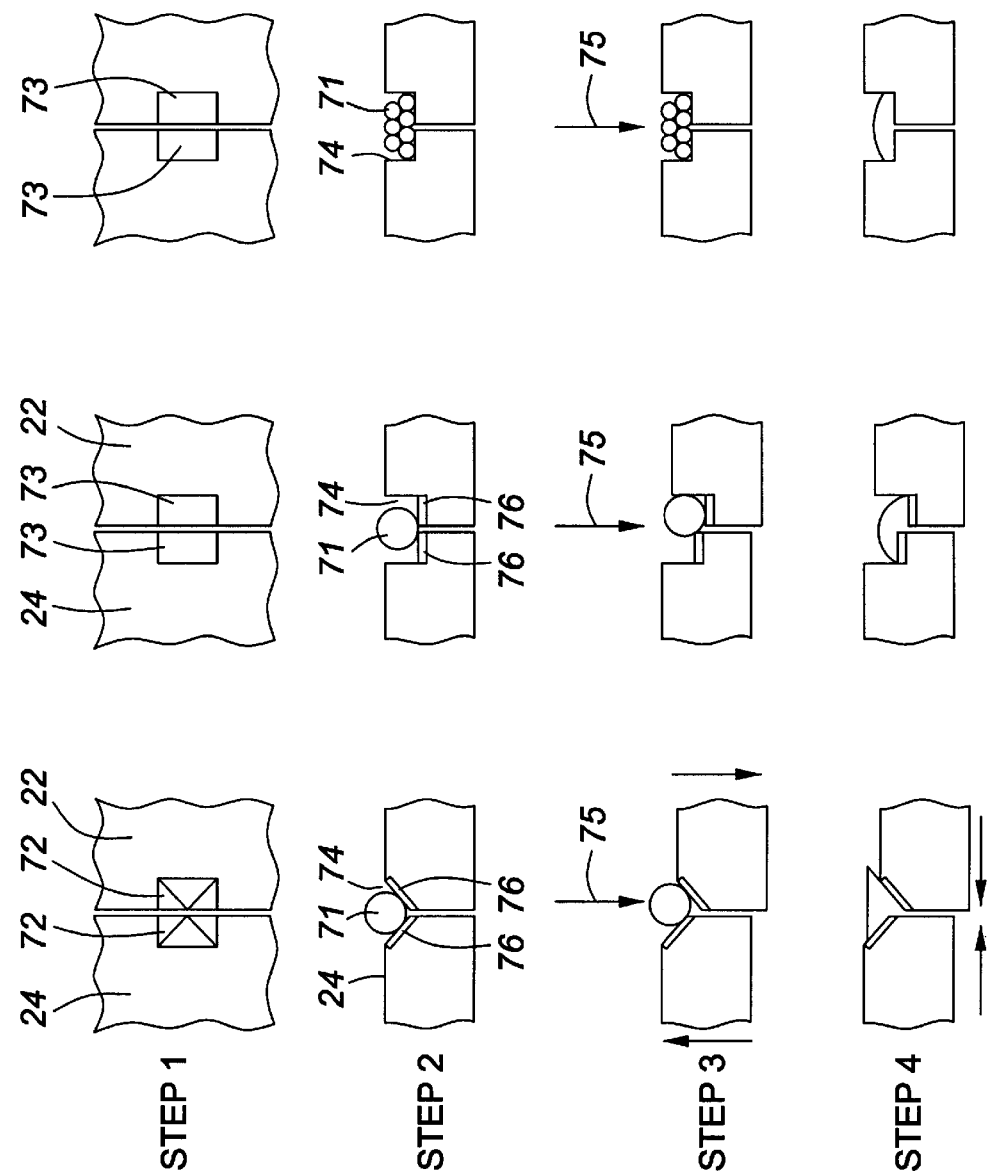
FIG. 2D is a detailed view of the steps of a further method for affixing the compliant lever to the remainder of the substrate.

FIG. 2D illustrates a fourth method for fixing the primary substrate portion 24 to the compliant lever arm 22, in which glass pre-forms 71 are melted, forming a bond. The glass can be any suitable glass known in the industry, including specialty solder glass. It is preferable that the glass have alower melting point than the substrate, and that the glass wets to the substrate to form a bond. Initially, (step 1) a plurality of beveled sections 72 or recessed areas 73 are formed in the edges of the primary substrate portion 24 and the lever arm 22. The beveled sections 72 (or recessed area 73) of the lever arm 22 are formed adjacent to the beveled sections 72 (or recessed area 73) of the primary substrate portion 24, whereby adjacent sections (or areas) form v-shaped (or square) depressions 74. The glass pre-forms 71 are placed within the depressions 73 (step 2) and the components are aligned according to the aforementioned invention. Subsequently, the glass pre-forms 71 are subjected to a focused beam of light 75 (step 3), which melts the pre-forms (step 4), forming a bond between the primary substrate 24 and the lever arm 22. If necessary, the bottom of the depression 74 is coated with a metalized layer 76 to facilitate the glass bonding to the depression. Any suitable material can be used for the layer 76, e.g. gold (Au) or gold and Tin (AuSn). However, if the primary substrate portion 24 and the lever arm 22 are silicon, the inetalized layer 76 is normally unnecessary, since the glass wets to the silicon. The glass preforms can have any applicable form, such as balls, rods or powder.

Having described four specific examples of methods for fixing the compliant lever with respect to the primary substrate portions, it should be apparent that a variety of specific configurations are possible while remaining within the scope of the present invention. Any compatible means for securing the position of the compliant lever such that at least one optical component mounted thereon becomes fixed in an aligned position with respect to the light path is appropriate for use with the micro-alignment assembly of the present invention. As an additional step, the resilient section of any of the forgoing can be cut, for example, by a laser following the fixing process in order to reduce potential stress effects in the substrate, which may result in drifting of the alignment with time or due to changes in environmental conditions.

Figure 3:
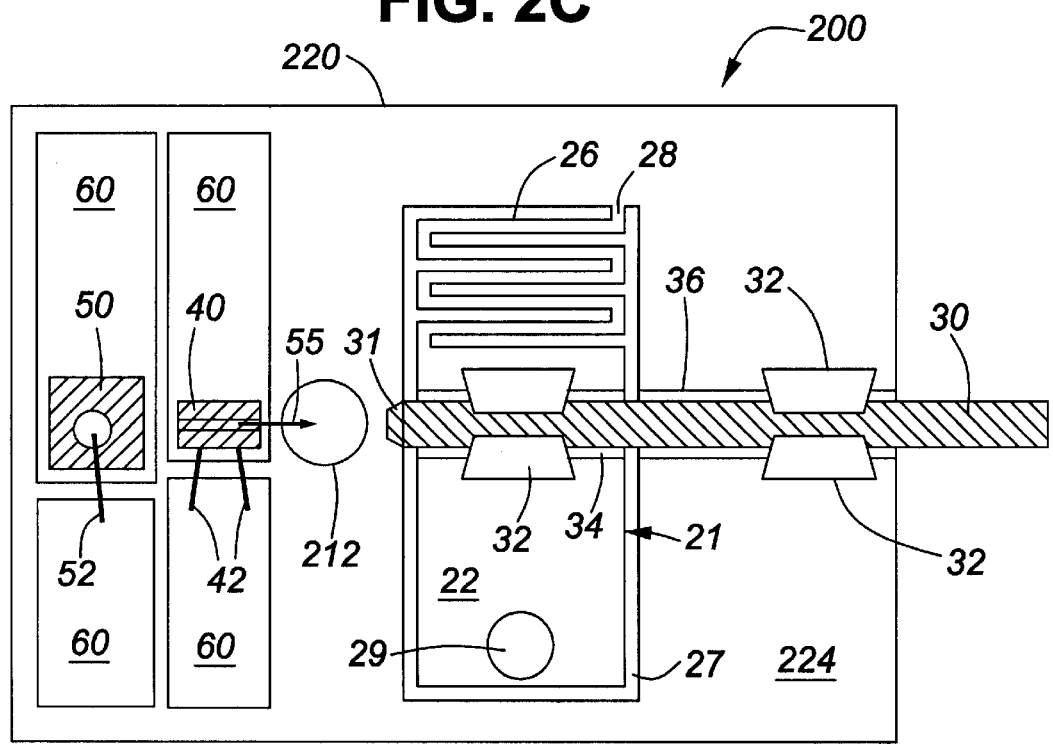
FIG. 3 is a diagrammatic plan view of a fiber-pigtailed optical transmitter including the micro-alignment assembly of the present invention.

Turning to FIGS. 3–6, a few of the many possible configurations for optical device arrangements based on the optical component micro-alignment assembly of the present invention will be described. FIG. 3 illustrates an optical transmitter 200 which includes a substrate 220. Substrate 220 is essentially identical to substrate 20 shown in FIG. 1, including compliant lever 21 with optical fiber 30 mounted thereon, but with a slight modification in primary substrate area 224. Specifically, primary substrate area 224 includes extra spacing between mounting pads 60 and a nearest edge of compliant lever 21, in which extra spacing a ball lens 212 is mounted. In the embodiment illustrated in FIG. 3, ball lens 212 is passively aligned and mounted in front of laser chip 40 and is configured to improve the optical coupling efficiency between laser chip 40 and optical fiber 30. However, care is required in aligning lensed tip 31 of optical fiber 30 with respect to ball lens 212 to avoid lowering the efficiency in the coupling of light into the optical fiber. In this regard, optical fiber 30 is mounted on component mounting area 22 such that lensed tip 31 is movable with respect to ball lens 212 by manipulating compliant lever 21 to vary the position of lensed tip 31 with respect to ball lens 212 thereby facilitating adjustment to achieve optimum coupling efficiency of light into the optical fiber. After the optical fiber has been brought into an aligned position, compliant lever 21 may be fixed with respect to primary substrate area 224 by any suitable method, for example, but not limited to, methods illustrated in FIGS. 2A–2C.

Figure 4:
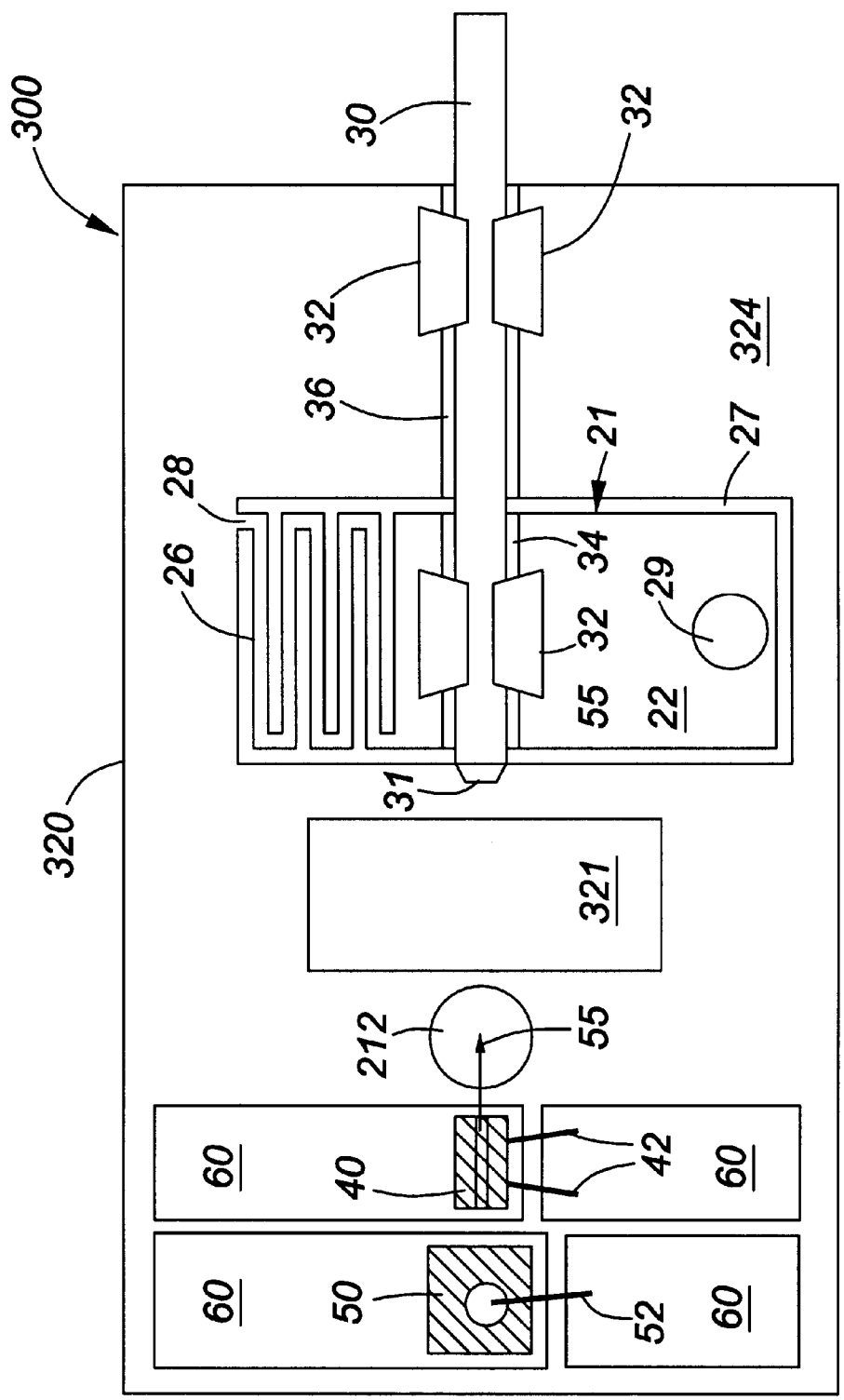
FIG. 4 is a diagrammatic plan view of an optical isolator including the micro-alignment assembly of the present invention.

FIG. 4 illustrates an optical isolator based on the optical component micro-alignment assembly of the present invention generally indicated by the reference number 300. Optical isolator 300 includes a substrate 320, which is generally identical to substrate 220 of FIG. 3, but modified such that primary substrate area 324 is slightly expanded to accommodate ball lens 212 as well as a filter 321 between the laser chip and the compliant lever. Filter 321 is configured to pass light from laser chip 40 toward optical fiber 30 while substantially blocking any stray light reflected from optical fiber 30 toward the laser chip. Moreover, filter 321 transmits only light of the specific optical wavelength emitted by laser chip 40. The position of lensed tip 31 of optical fiber 30 is again adjustable by moving compliant lever 21. Once optimum coupling efficiency is attained, compliant lever 21 may be secured to primary substrate area 324 by one of the aforedescribed methods.

Figure 5:
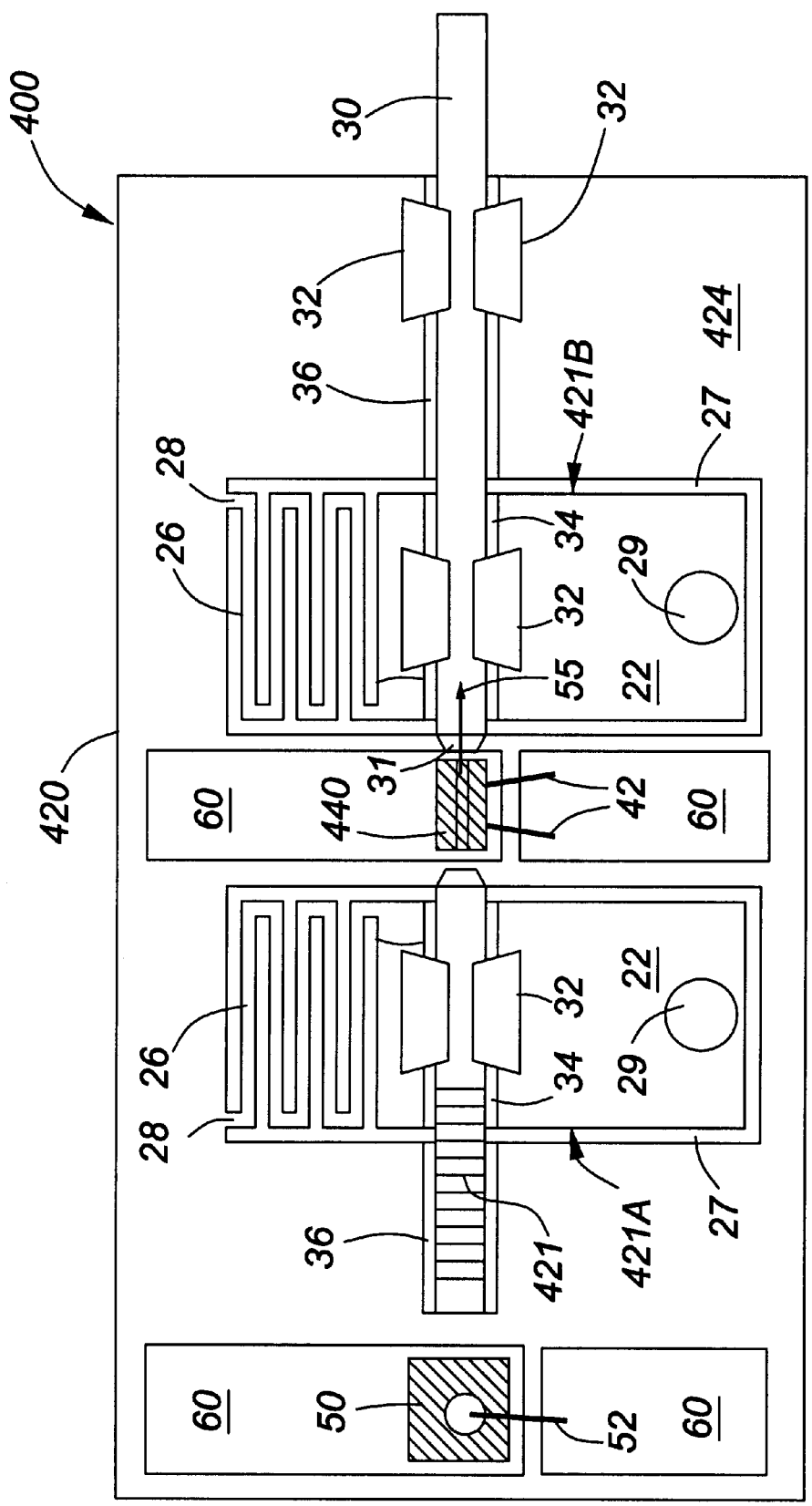
FIG. 5 is a diagrammatic plan view of an external grating device including the micro-alignment assembly of the present invention.

Attention is now directed to FIG. 5, which illustrates a fiber-pigtailed, external cavity laser assembly based on the optical component micro-alignment assembly of the present invention, generally indicated by reference numeral 400. Fiber-pigtailed, external cavity laser assembly 400 includes a substrate 420 with first and second compliant levers integrally formed therein, indicated by the reference numbers 421A and 421B, respectively. While photodiode 50 and its associated connector 52 are mounted at an outermost edge of primary substrate area 424, as in previously illustrated embodiments, a modified laser chip 440 is mounted between the two compliant levers of substrate 420. Laser chip 440 is configured to cooperate with a fiber grating 421, which is mounted on a first one of the two compliant levers, such that an external cavity laser results. Each compliant lever is configured to accommodate and secure one end of an optical fiber in its respective component mounting area. An optical fiber 30 is mounted on a second one of the compliant levers, in an analogous manner to previously described embodiments, and couples light away from the external cavity laser set up by the combination of laser chip 440 and fiber grating 421. Primary substrate area 424 is equipped with additional V-grooves 36 to support optical fiber 30 as well as fiber grating 421.

Continuing to refer to FIG. 5, the position of fiber grating 421 in relation to laser chip 440 is adjustable by moving the first compliant lever. Thus, the alignment of fiber grating 421 with respect to laser chip 440 is optimizable. Additionally, the position of the second compliant lever, and thereby optical fiber 30 mounted thereon, is adjustable to improve the coupling of light from the external cavity laser arrangement into optical fiber 30. When compliant levers 421A and 421B have been brought into their respective aligned positions, the compliant levers may be fixed in place with respect to primary substrate area 424 by one of the aforedescribed methods.

Figure 6:
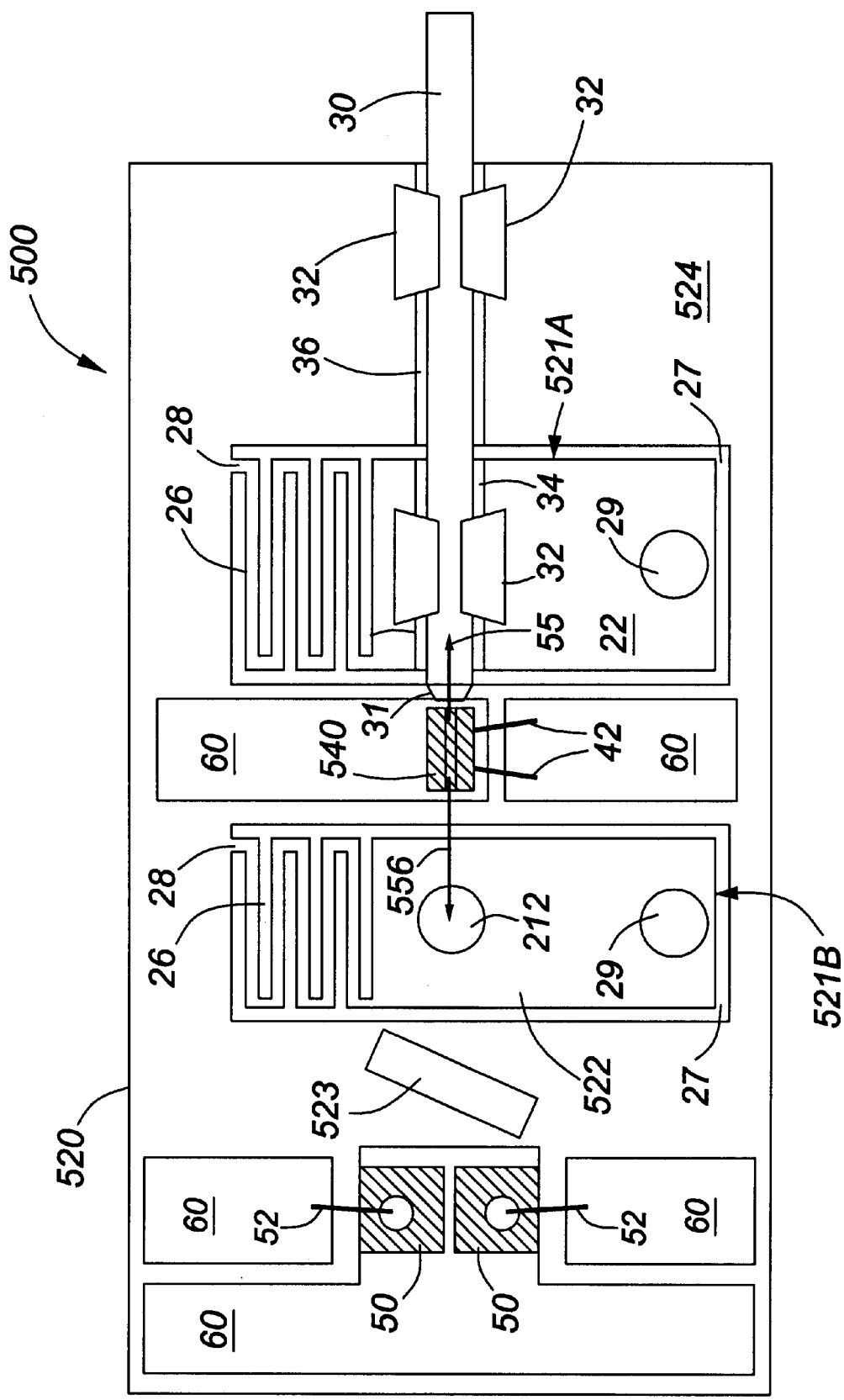
FIG. 6 is a diagrammatic plan view of a wavelength-locker including the micro-alignment assembly of the present invention.

Referring flow to FIG. 6 in conjunction with FIG. 5, a wavelength locker based on the optical component micro-alignment assembly of the present invention is generally indicated by the reference number 500. Wavelength locker 500 includes a substrate 520. Like substrate 420 of FIG. 5, substrate 520 includes first and second compliant levers, each of which has an optical component mounted thereon. Substrate 520 includes compliant lever 521A, on which optical fiber 30 is mounted, and a modified, compliant lever 521B, which is configured to accommodate ball lens 212 thereon. The remaining area of substrate 520, outside of the two compliant levers, defines a primary substrate area 524. Like the fiber-pigtailed, external cavity laser assembly of FIG. 5, a laser chip 540 is mounted on mounting pads 60 on primary substrate area 524 between the two compliant levers.

An interference filter 523 and two photodiodes 50 are also mounted on primary substrate area 524. Laser chip 540 is configured such that a portion of laser light (indicated by arrow 556) generated within laser chip 540 is emitted toward ball lens 212. Ball lens 212, interference filter 523 and photodiodes 50 are arranged such that this portion of laser light is directed through ball lens 212 and interference filter 523. Interference filter 523 is oriented to transmit light of a desired laser wavelength to one of photodiodes 50 while transmitting light of another undesired wavelength, both of which are potentially present in the test portion of laser light, to the other of photodiodes 50. Changes in the ratio of the amount of light of the desired laser wavelength at the first mentioned photodiode 50 to the amount light of the undesired wavelength detected at the other photodiode are converted into an electronic error signal. This electronic error signal is then used to correct the operating parameters of laser chip 540 to achieve stable wavelength laser operation.

Transmission of the test portion of laser light through ball lens 212 and into interference filter 523 is adjustable by manipulation of compliant lever 521B, on which ball lens 212 is mounted. In performing this adjustment, the coupling of the test portion of laser light into photodiodes 50 is optimized. Furthermore, as in previously described embodiments, the position of optical fiber 30 with respect to light path 55 defined by the light output from laser chip 540 is adjustable by movement of compliant lever 521A, on which optical fiber 30 is mounted. After the two compliant levers have been adjusted such that ball lens 212 and optical fiber 30 are in their aligned positions, compliant levers 521A and 521B are fixed in place with respect to primary substrate portion 524 by one of the aforedescribed methods.

Figure 7A:
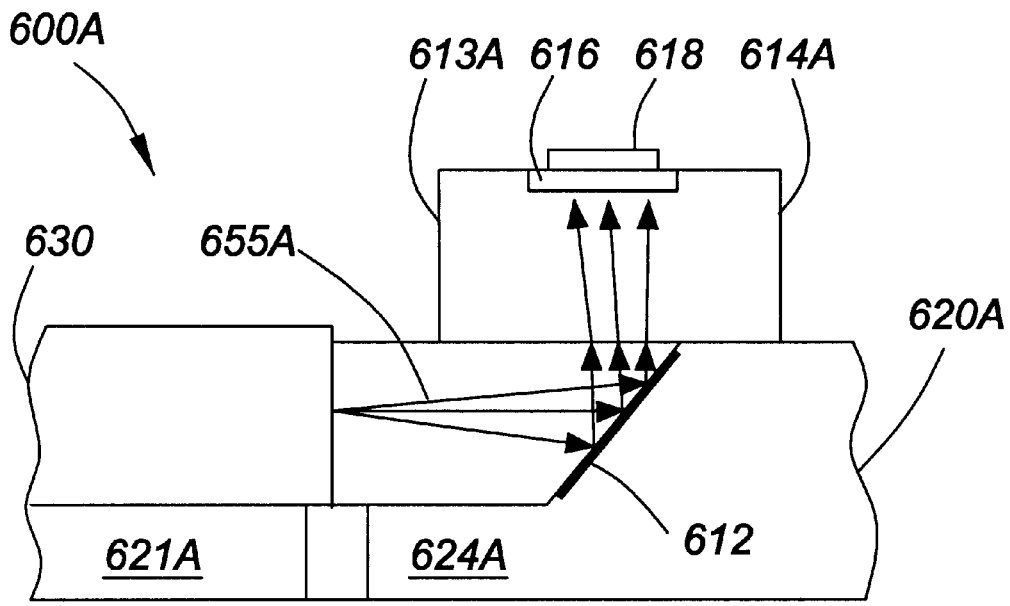
FIGS. 7A and 7B are diagrammatic partial cut away elevational views of planar photodetector arrangements including the micro-alignment assembly of the present invention.
Figure 7B:
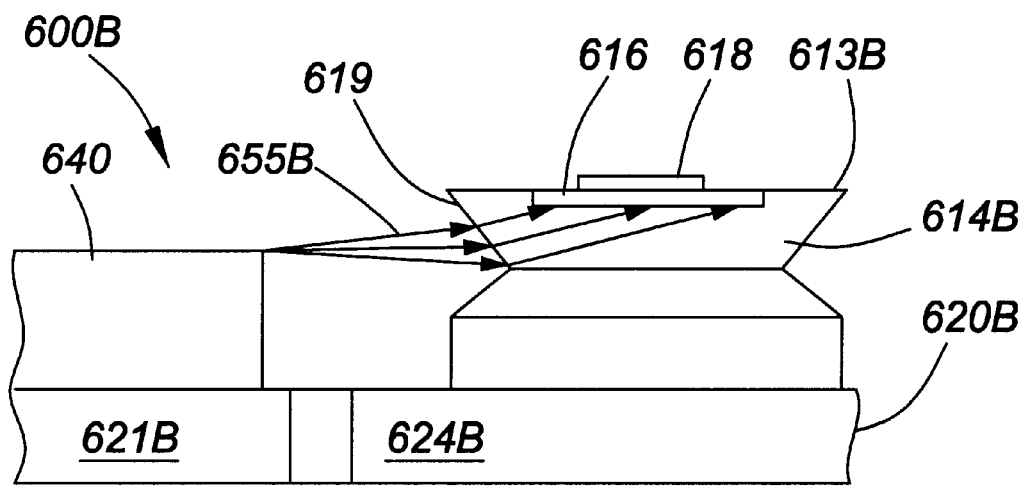

Considering the aforedescribed problem relating to photodetector arrangements, attention is now directed to the partial cut away elevational views of FIGS. 7A and 7B. Photodetector arrangements 600A and 600B are shown in cross section in FIGS. 7A and 7B, respectively, for purposes of eliminating the problem of having the light source and the photodetector on separate substrates. To that end, the light sources and the photodetectors are arranged on common substrates. The photodetector arrangements shown in FIGS. 7A and 7B are generally called planar arrangements because the light source and the photodetector are fabricated essentially on the same substrate plane.

Referring specifically to FIG. 7A, photodetector arrangement 600A includes a substrate 620A (only partially shown) which is divided into compliant lever 621A and primary substrate portion 624A. Compliant lever 621A is integrally formed from substrate 620A in accordance with the teachings above and is designed to accommodate optical fiber 630 thereon. Optical fiber 630 is oriented such that a remote end (not shown) is connected to a light source to provide light output 655A at another end illustrate mounted on compliant lever 621A. Light output 655A is directed toward a sloped facet 612 of primary substrate portion 624A. Sloped facet 612 includes a suitable reflective coating, such as a gold coating, to redirect light output 655A in a direction perpendicular to substrate 620A. A rear-entry type photodetector 613A is mounted on an upper surface of primary substrate portion 624A using a transmissive mount 614A such that redirected light output 655A is transmitted through transmissive mount 614A and is detected at a detector head 616. The intensity of detected light is converted into an electronic signal by circuitry 618. In order to control the amount of light output 655A that is received at detector head 616, the position of the light emitting end of optical fiber 630 is adjustable by moving compliant lever 621A. Thus, optimum coupling of light from optical fiber 630 into photodetector 613A is achieved. Compliant lever 621A is secured relative to primary substrate portion 624A following alignment such that optical fiber 630 is fixed in its optimum aligned position with respect to photodetector 613A.

Turning to FIG. 7B, photodetector arrangement 600B includes a substrate 620B, which is divided into an integrally formed, compliant lever 621B and a primary substrate portion 624B. Compliant lever 621B is configured to accommodate a laser chip 640 thereon. Laser chip 640 emits light output 655B at one of its edges. An edge detector type photodetector 613B is mounted on primary substrate portion 624B and opposite laser chip 640. Photodetector 613B includes a shaped, transparent mount 614B with a detector head 616 connected to circuitry 618. Transparent mount 614B includes a sloped facet 619 which is configured to receive and redirect light output 655B toward detector head 616. Light coupling from laser chip 640 into detector head 616 is adjustable by moving compliant lever 621B, thus optimizing the position of laser chip 640 with respect to photodetector 613B. Laser chip 640 is then fixed in an aligned position by securing compliant lever 621 onto primary substrate portion 624B.

Figure 8:
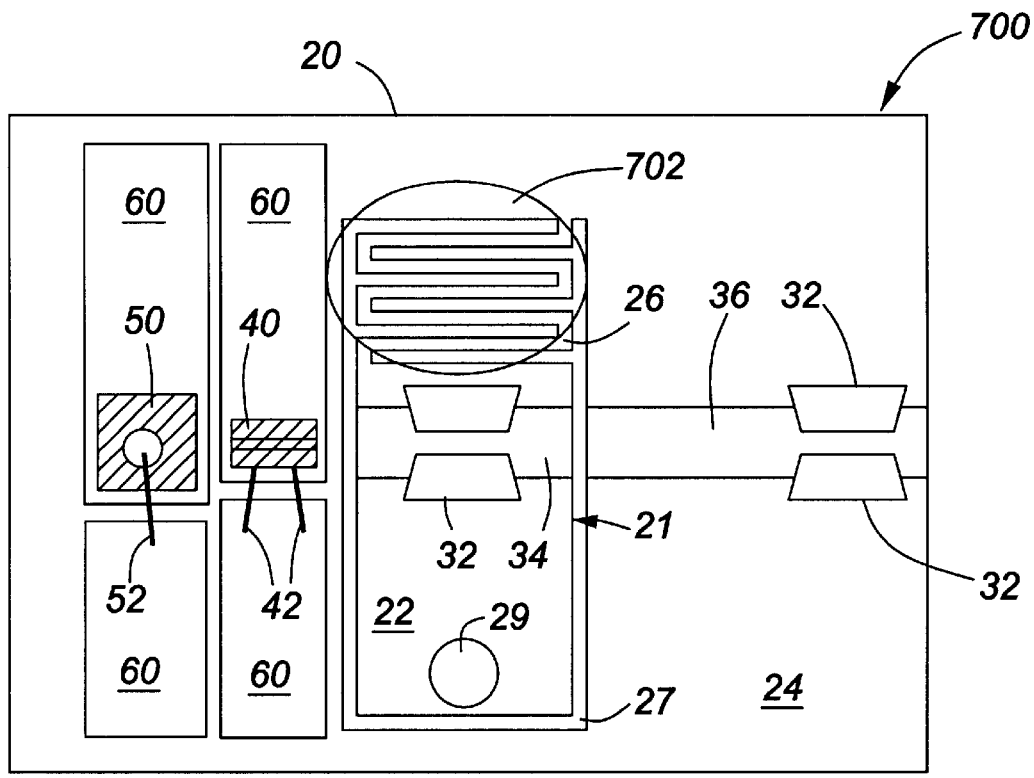
FIG. 8 is a diagrammatic plan view of the micro-alignment assembly embodiment of FIG. 1 shown here to illustrate a laser glazing method for rigidifying the compliant lever.

Referring now to FIG. 8, an additional option for the optical component micro-alignment assembly of the present invention is described. A micro-alignment assembly is generally indicated by reference number 700 and includes substrate 20, which has all of the features and components as described with reference to FIG. 1. As discussed in conjunction with FIGS. 2A–2C, compliant lever 21 is fixable relative to primary substrate area 24 in order to secure the optical component, which is mounted on compliant lever 21, in an aligned position. In order to further secure the position of compliant lever 21, resilient section 26 is independently fixed such the resilient section 26 is rigidified and no longer provides compliancy.

Such a rigidifying effect is obtained in one highly advantageous way by covering the resilient section with a laser glaze 702, as shown in FIG. 8. Laser glaze 702 is formed in a heretofore unseen manner in a silicon-to-silicon laser welding procedure to be described in further detail. Specifically, laser glaze 702 is essentially a thin weld formed over most of resilient section 26 such that the resilient section is no longer flexible. In other words, the flat baffle spring (see FIG. 1) essentially formed of spaced apart, resilient strips defining spaces between adjacent ones of the resilient strips; the spaces between these adjacent resilient strips of the flat baffle spring are bridged by laser glazing so that compliant lever 21 becomes rigidified and cannot be readily moved. Alternatively, space 27 around compliant lever 21 may be bridged surrounding the component mounting area using this laser glazing technique. The laser glazing technique may be used in conjunction with the aforedescribed methods for securing the compliant lever to the primary substrate portion in order to further lock the optical component, which is mounted on the compliant lever, in an aligned position.

Figure 9:
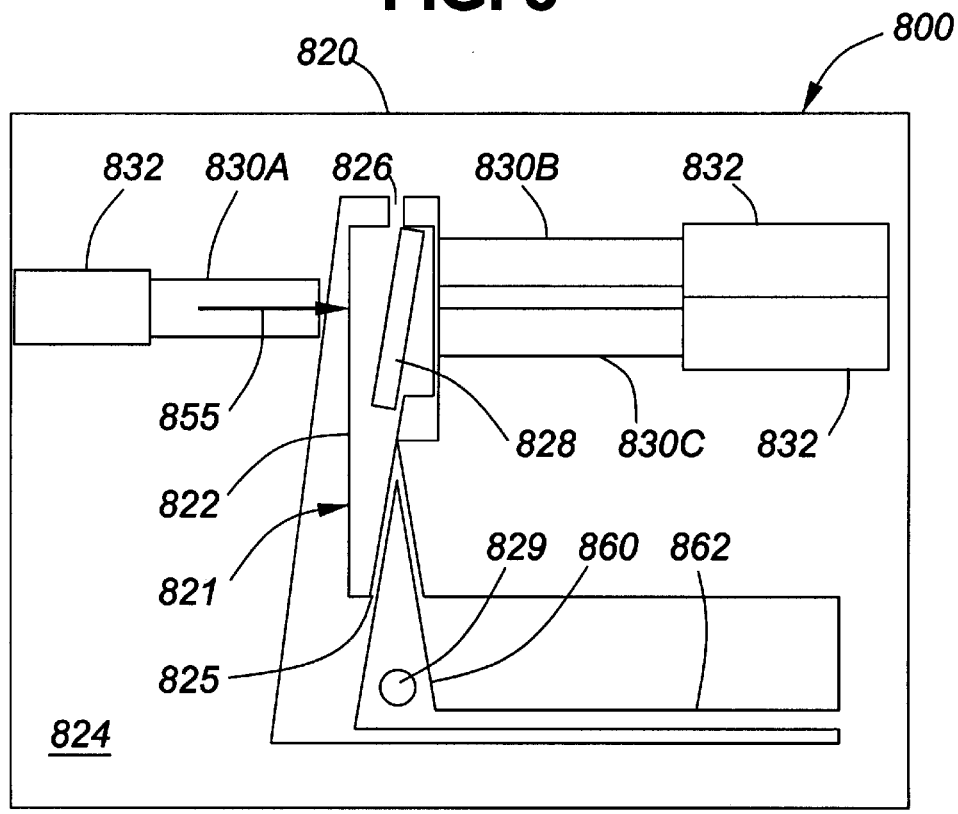
FIG. 9 is a diagrammatic plan view of another embodiment of a micro-alignment assembly manufactured in accordance with the present invention shown here to illustrate the use of a wedge structure to induce rotational motion of the compliant lever.

FIG. 9 is an illustration of another variation of a micro-alignment assembly of the present invention, generally indicated by reference number 800. Micro-alignment assembly 800 includes a substrate 820. A compliant lever 821 is integrally formed from substrate 820 and includes a component mounting area 822 and a resilient attachment member 826. In micro-alignment assembly 800, a beam steering filter 828 is mounted on component mounting area 822. A movable wedge 860 and an attachment arm 862 are also integrally formed from substrate 820. Substrate 820 also includes substrate 20 shown in FIG. 1, indicated by the reference number 824. Primary substrate portion 824 is defined by the main portion of substrate 820, excluding the compliant lever and movable wedge components. Optical fibers 830A–830C, each in a sleeve 832, are mounted on primary substrate portion 824 such that optical fiber 830A is positioned on one side of compliant lever 821 while optical fibers 830B and 830C are generally parallel to each other and are located on an opposing side of compliant lever 821, as shown in FIG. 9. A remote end of optical fiber 830A is connected to a light source (not shown) such that light, indicated by arrow 855, is emitted at an opposing, illustrated end of optical fiber 830A to define a light path.

Compliant lever 82 land primary substrate portion 824 are configured such that one edge of compliant lever 821 and an opposing edge of primary substrate portion 824 together form a V-shaped opening 825 which accommodates movable wedge 860. When movable wedge 860 is biased into or out of opening 825, compliant lever 821 pivots by compliance of attachment member 826 generally in the plane of substrate 820, thereby rotating beam steering filter 82i in a plane parallel to substrate 820. In the micro-alignment assembly shown in FIG. 9, this accurate movement of the beam steering filter results in the redirection of light 855 from traveling toward optical fiber 830B to traveling toward optical fiber 830C, and vice versa. Thus, micro-alignment assembly 800 functions as a spatial switch to switch the light input between optical fibers 830B and 830C by manipulation of movable wedge 860. Micro-alignment assembly 800 also has the advantage of excellent mechanical stability once movable wedge 860, and thereby compliant lever 821, have been biased into aligned positions and fixed to primary substrate portion 824 because the movable wedge, compliant lever, and primary substrate portion are in biasing contact.

Figure 10A:
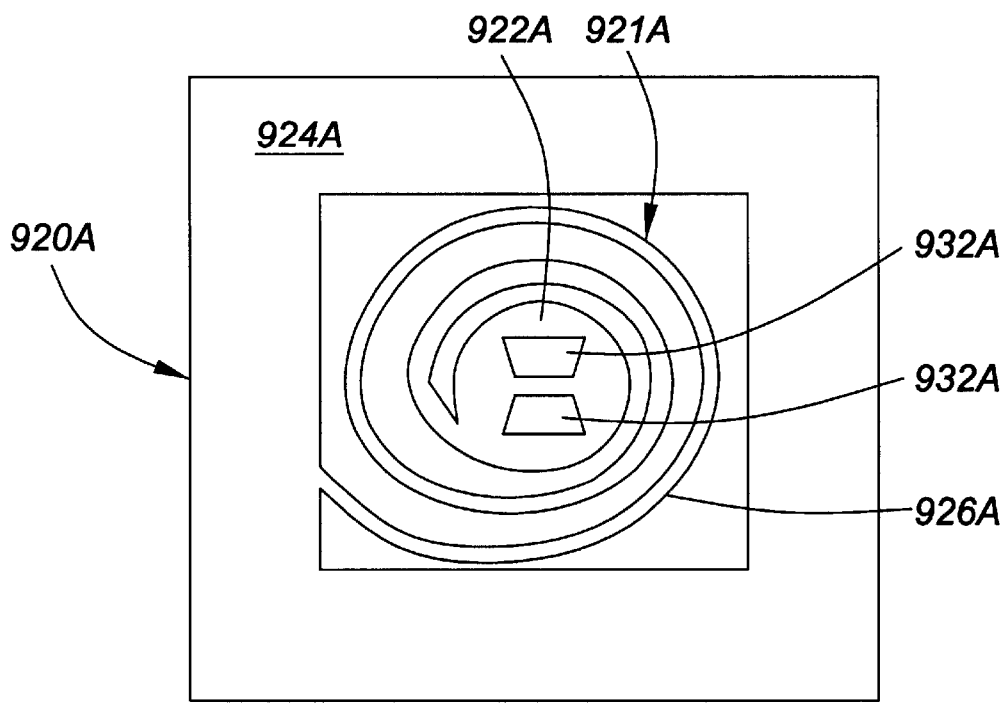
FIGS. 10A and 10B are diagrammatic plan views of alternative implementations of the compliant lever in an micro-alignment assembly manufactured in accordance with the present invention.
Figure 10B:
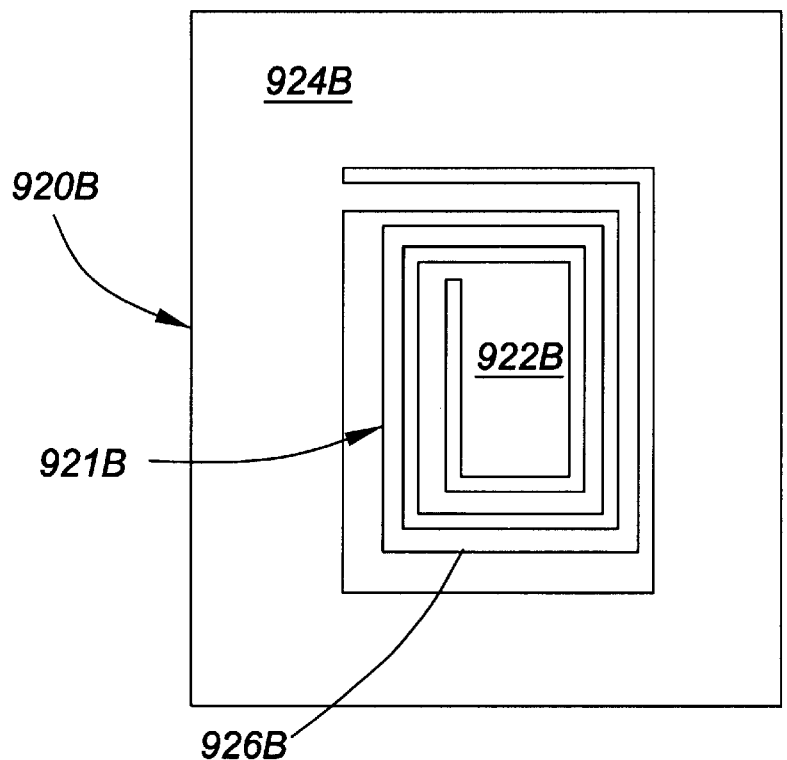

FIGS. 10A and 10B illustrate still further modifications with respect to the optical component micro-alignment assembly of the present invention. Specifically, FIGS. 10A and 10B show alternate configurations for the compliant lever of the present invention. Substrates 920A and 920B in FIGS. 10A and 10B, respectively, illustrate embodiments of compliant levers in which the component mounting area is surrounded by the resilient section. The configurations shown in FIGS. 10A and 10B have an advantage over the aforedescribed embodiments in that balanced degrees of freedom are available in the motion of an optical component mounted thereon.

In FIG. 10A, a compliant member 921A is integrally formed from substrate 920A in a spiral spring configuration. The remaining area of substrate 920A, excluding compliant member 921A, defines a primary substrate portion 924A. Compliant member 921A includes a component mounting area 922A, which is surrounded by resilient section 926A. Like the compliant levers of aforedescribed embodiments, compliant member 921A is movable with respect to primary substrate area 924A such that an optical component (now shown), which is mounted on component mounting area 922A, is thereby movable with respect to a light path (not shown). Compliant member 921A can be moved both in and out of the plane of substrate 920A, be rotated along a rotational axis that is perpendicular to the plane of substrate 920A by coiling and uncoiling of the spiral spring, and displaced laterally in the plane of the figure.

Referring to FIG. 10B, a compliant member 921B is integrally formed from substrate 920B in the shape of a flat, rectangular spring, in which a component mounting area 922B is surrounded by resilient section 926B. Compliant member 921B is movable both in and out of the plane of substrate 920B and provides a limited rotational movement along a rotational axis perpendicular to the plane of substrate 920A by coiling and uncoiling of the spring.

The embodiments illustrated in FIGS. 10A and 10B, like that of FIG. 9, are useful in applications in which rotational motion is desired. Many other shapes of the compliant lever are contemplated in order to provide different degrees of freedom of motion with regards to the translation and rotational directions.

Figure 11:
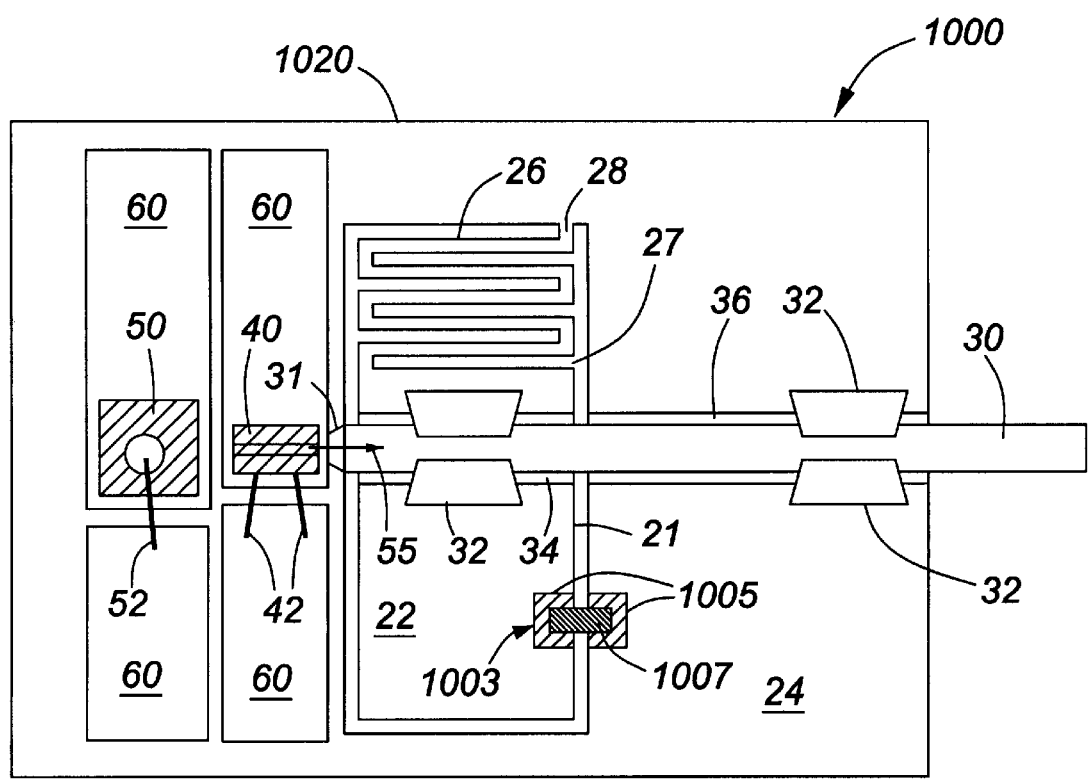
FIG. 11 is a diagrammatic plan view of still another embodiment of a micro-alignment assembly manufactured in accordance with the present invention shown here to illustrate an alternative, contact-free mechanism to provide motion of the compliant lever.

Attention is now directed to FIG. 11, in which an alternative method for producing motion of a compliant lever is illustrated in a micro-alignment assembly generally indicated by reference number 1000. Micro-alignment assembly 1000 includes a substrate 1020, which is similar to substrate 20 of FIG. 1 with a few modifications. Whereas substrate 20 includes a circular opening 29 formed in compliant lever 21 for mechanically gripping the compliant lever, substrate 1020 instead includes an actuator assembly 1003. Actuator assembly 1003 includes bases 1005, one of which bases is formed on compliant lever 21 and another of which bases is formed on primary substrate area 24. Bases 1005 are connected by a bridge section 1007. As an example, actuator assembly 1003 can be based on a thermal mechanism in which one or both of bases 1005 is heated by, for instance, resistive heating such that bridge section 1007 expands or contracts according to the amount of applied heat, thereby inducing motion of compliant lever 21. As another example, one or both of bases 1005 can be a PZT block such that actuator assembly 1003 expands or contracts by application of a voltage due to electromechanical forces, thus moving compliant lever 21 by a desired amount. In still another example, bridge section 1007 can be removed, and bases 1005 can be configured such that a magnetic force or an electro-static force is established between bases 1005, thus causing compliant lever 21 to move in accordance with the applied force. The actuator assembly of FIG. 11 is advantageous in that the movement of compliant lever 21, and thereby the optical mounted thereon, is controlled without having to physically contact any part of micro-alignment assembly 1000. Therefore, barring potential hysteresis effects, the induced movement of the compliant lever is controlled precisely. As described with regard to previous embodiments, the compliant lever may be secured with respect to the primary substrate portion once the optical component has been brought into a desired aligned position.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and are therefore regarded as falling within the scope of the present invention. For example, a U-groove may be used in place of the V-grooves shown in the aforedescribed figures for accommodating the optical fibers or fiber grating. Other suitable materials, such as indium-gallium-arsenide (InGaAs), lithium niobate, metals or insulators, may be used as the substrate material or incorporated as a part of the substrate. Still further, more than two micro-alignment assemblies may be formed in a single substrate, and two or more optical components may be mounted on a single compliant lever. For instance, Applicant anticipates the fabrication of an entire optical system using multiple optical components mounted on a substrate with several micro-alignment assemblies such that the single substrate may contain a complex optical system that is readily optimizable by adjustment of the various compliant levers. Therefore, the present examples are to be considered as illustrative and not restrictive, and the invention is not to be limited to the details given herein but may be modified within the scope of the appended claims.

What we claim is:

1. A device for aligning a first optical component on a substrate with a second optical component comprising:

arm means pivotally connected to the substrate, the arm means being pivotable in every direction; spring means connecting the arms means to the substrate;

holding means for connecting the first optical component to the arm means; and actuator interface means on said arm means enabling manipulation of said arm means by an actuator, wherein said arm means extends into a cavity in the substrate, forming a groove around most of said arm means.

2. The device according to claim 1, wherein said spring means is a baffle spring extending from and contiguous with a side wall of the cavity.

3. The device according to claim 1, wherein said spring means is a flat spiral spring, surrounding said holding means.

4. The device according to claim 1, further comprising laser glazing means for applying a laser glaze across a portion of said spring means and the substrate to prevent relative movement thereof.

5. The device according to claim 1, further comprising fixing means for securing said arm means to the substrate after the first component has been aligned with the second component.

6. The device according to claim 5, further comprising first metallic pads on the substrate, and second metallic pads on said arm means adjacent said first metallic pads for securing said first metallic pads to said second metallic pads by welding.

7. The device according to claims 5, wherein said fixing means comprises a weld securing said arm means to the substrate.

8. The device according to claim 5, wherein said fixing means includes an adhesive bond between said arm means and the substrate.

9. The device according to claim 5, wherein recessed areas in edges of said arm means and recessed areas in the substrate, which are adjacent to the recessed areas in said arm means, form depressions; and wherein said fixing means includes glass melt in the depressions bonding said arm means to the substrate.

10. A method for aligning a first optical component on a substrate with a second optical component comprising the steps of:

providing arm means pivotally connected to the substrate, said arm means having holding means for connecting the optical component thereto, and actuator interface means enabling manipulation of said arm means by an actuator;

aligning the first optical component with the second optical component using the actuator to manipulate the position of said arm means; and fixing said arm means to the substrate when the first optical component is aligned with the second optical component.

11. The method according to claim 10, wherein during said aligning step the actuator applies a force to said arm means, and wherein said force is of the type selected from the group consisting of magnetic, electrostatic, electromechanical, and thermally induced.

12. The method according to claim 10, wherein said fixing step includes a fixing technique selected from the group consisting of laser welding the substrate directly to said arm means, welding a metallic pad secured to the substrate to a metallic pad secured to said arm means, and adhering said arm means to the substrate using a suitable adhesive.

13. The method according to claim 10, wherein the providing step includes etching said arm means from the substrate; and wherein said arm means includes spring means, integrally connecting said arm means to the substrate.

14. The method according to claim 13, wherein said spring means is a baffle spring or a spiral spring.

15. The method according to claim 13, further comprising separating said spring means from the rest of said arm means after said fixing step.

* * * * *